United States Patent Office 3,459,364
Patented Aug. 5, 1969

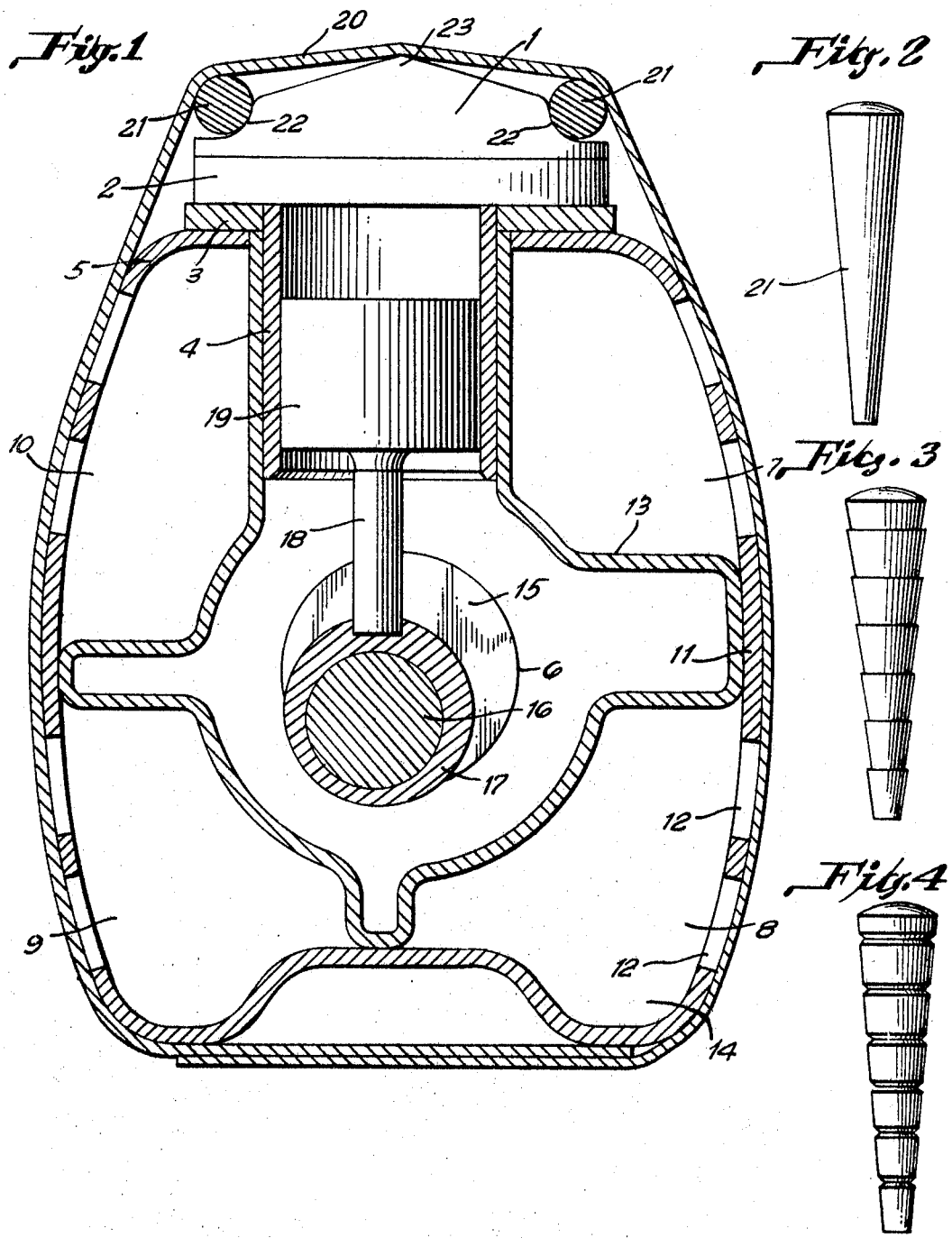

3,459,364
COMPRESSOR ESPECIALLY FOR REFRIGERATING MACHINES
Knud V. Valbjorn, Nordborg, Bendt Wegge Larsen, Augustenborg, and Anker Erik Madsen, Nordborg, Denmark, assignors to Danfoss A/S, Nordborg, Denmark, a company of Denmark
Filed Dec. 11, 1967, Ser. No. 689,374
Claims priority, application Germany, Dec. 17, 1966, 51,810
Int. Cl. F01b 29/08; F04b 39/12
U.S. Cl. 230—58                                    6 Claims

ABSTRACT OF THE DISCLOSURE

The invention relates to compressors of the type used in refrigerating machines. Compressors of this type have a cylinder assembly and a cylinder head which must be soundly fastened together during the assembly operation and must be capable of being disassembled relatively easily for repairs. The invention involves the use of a closed ended metal clamping strip for attaching the cylinder head to the cylinder assembly. In the assembly operation the closed ended strip, in the first instance, loosely surrounds these two members and then has the slack thereof taken up by one or more wedge shaped members being driven between the closed ended strip and one of the members. The wedge shaped members function to tension the strip and thereby soundly connect the cylinder head to the cylinder assembly.

---

The present invention relates to a piston compressor, particularly for refrigerating machines, in which a component comprising the cylinder and a component comprising the cylinder-head are connected by a strip surrounding both components.

The fitting of the cylinder-head on the cylinder with the help of a clamping strip has the advantage that no space for fixing means is required near the cylinder and also that no undesirable stresses can occur as a result of such fixing means on the cylinder. Furthermore, more than two components can be connected with the help of the strip.

A method for fitting the strip has already been proposed wherein the metal strip is deformed by an electromagnetic field and is pressed closely onto the components. This method, very useful in itself, does however have the disadvantage that the resultant connection cannot be released or can only be released by destroying the strip, so that stripping down of the compressor at a later stage, for example for repair purposes, is not possible. Furthermore, there are also cases in which the electro-magnetic field not only acts upon the clamping strip but also, in an undesirable manner, on the metal of the parts to be connected, for instance when these consist of the same materials as the clamping strip. Not the least of the disadvantages is that a special machine, capable of producing the electro-magnetic field, is required for this method of production.

The object of the present invention is to provide a clamping strip fixing system which can be produced with the help of simple handy means and can be released again.

According to the invention this object is achieved by tensioning the strip by means of wedges driven between the strip and the component or components. In particular, the wedges in question can be conical, although wedges having a polygonal cross-section, and other forms of wedge can be considered.

In this arrangement the clamping strip can be readily placed around the components to be connected in a loose condition. The desired tension on the strip is achieved by driving in the wedges. The connection can be broken again by withdrawing the wedges. This method of fixing requires only a very simple hand tool.

Surprisingly, a method of fixing of this kind meets all the requirements imposed on a permanent connection. Here, it may be recalled that in refrigerating machines a guarantee of efficiency of five years and more must be given. Because of the wedges, the strip is resiliently stressed in such manner that it presses the components towards each other with any force that may be selected. The same force however is also applied to the wedges by the strip, so that despite vibration during operation of a compressor, the wedges remain firmly in place. By selecting an appropriately small wedge-angle, for example 5°, a reliable self-locking action is achieved.

If required, the wedges may also incorporate a stepped portion which, in the clamping position, engages behind the edge of the strip and in this manner further locks the tensioning wedge in position. The wedge may also have one or more locking grooves on its tensioning surface, these grooves increasing the cohesive force. This is recommended if the wedge-angle exceeds a certain magnitude, for example 8°.

Particularly to be recommended is a construction wherein recesses are provided in at least one component, the wedges being guided in these as they are driven in. These guides can, in turn, be so inclined that the wedges bear against the strip along a line which runs approximately parallel with the axis of the shaft.

In a further embodiment of the invention, openings are provided in the wall of at least one of the components, the strip bearing against this wall. These openings are completely sealed under the tension of the strip.

The invention will now be described in more detail by reference to an embodiment illustrated in the drawing, wherein:

FIG. 1 shows a cross-section, partially simplified, through a motor compressor,

FIG. 2 is the side elevation of a conical tensioning pin,

FIG. 3 is a side elevation of a conical tensioning pin having locking edges, and FIG. 4 is a side elevation of a conical tensioning pin having transverse locking grooves.

In the compressor illustrated, a cylinder-head 1, which contains a suction valve chamber and a pressure valve chamber, is held against the end plate 3 of a cylinder 4, there being interposed a valve plate 2 which comprises passages and the suction valve as well as the pressure valve. The interposed sealing plates are not illustrated. The end plate 3 and the cylinder 4 are elements of a component 5 which also incorporates the main bearing 6 of the compressor as well as four noise-reducing chambers 7–10. The noise-reducing chambers are bounded by a peripheral wall 11, having four openings 12 on each side, and an inner supporting wall 13 which bears by its ends against the cylinder 4 and by projecting portions against the peripheral wall 11. The walls 11 and 13 are closed at their end edges by roughly parallel protecting walls, of which only the lower wall 14 is visible in this illustration. The parts 3, 4, 11, 13 and 14 and the other protective wall are assembled and joined together by hard soldering. A motor crankshaft 15 runs in the main bearing 6, the crank pin 16 of this shaft driving a piston 19, reciprocating in a cylinder 4, by way of a crank bearing 17 and a connecting rod 18.

For the purpose of assembling the cylinder-head 1, the valve plate 1 and the component 5, a clamping strip 20 is fitted loosely around the entire arrangement. The clamping strip is made of steel. Its overlapping edges are connected by spot-welding. Two conical clamping wedges 21 having a slight taper, of 5° for instance, are then driven between the clamping strip 20 and the cylinder-head at the positions illustrated. For this purpose, the cylinder-head 2 contains recesses 22 which guide the conical pins 21 when they are driven in, and these recesses are inclined relatively to the axis of the shaft at an angle roughly equal to that of the wedge. Consequently, the strip 20 is put under tension. It lies against the top of the cylinder-head 1 and against virtually the whole periphery of the wall 11. For given dimensions of the clamping strip and of the other components, it is possible to fix the required tension in the connexion by appropriate choice of the size of the tensioning wedges 21 or by the length of the distance to which they are driven in. The clamping strip acts symmetrically upon the head 1 by way of the tensioning wedges 21, so that the head is held firmly and closely on the cylinder 4. Conversely, the wedges are hereby clamped in such manner that they remain safely in position.

When tensioned, the material of the strip 20 also tgihtly seals up the openings 12.

Under certain conditions a single tensioning wedge will suffice. On the other hand, more than two tensioning wedges can be used. The tensioning wedges can also engage on the component 5. With larger wedge-angles, the wedges can be provided with locking edges engaging below the strip, or their tensioning surface can be provided with transverse locking grooves which increase the friction.

We claim:

1. A piston type compressor of the kind used for refrigerating machines, comprising, a cylinder assembly member, a cylinder head member, a closed ended strip surrounding said members, and wedge means driven between said strip and one of said members to tension said strip and connect said members together.

2. A piston type compressor according to claim 1 wherein said wedge means includes a conically shaped pin member.

3. A piston type compressor according to claim 1 wherein said wedge means includes a wedge member having a stepped portion which engages one edge of said strip.

4. A piston type compressor according to claim 1 wherein said wedge means includes a wedge mmeber having transversely extending grooves therein to increase the frictional resistance to dislodgement of said wedge member.

5. A piston type compressor according to claim 1 wherein said wedge means includes a tapered pin, and recess means in one of said members for guiding said pin to its inserted position.

6. A piston type compressor according to claim 1 wherein one of said members has an outer wall in which openings are formed, said strip being in abutting engagement with said wall and covering said openings.

References Cited

UNITED STATES PATENTS

| | | | |
|---|---|---|---|
| 1,974,421 | 9/1934 | Haunz | 230—58 XR |
| 2,864,551 | 12/1958 | Heidorn et al. | 230—58 |

ROBERT M. WALKER, Primary Examiner

U.S. Cl. X.R.

230—235